UNITED STATES PATENT OFFICE.

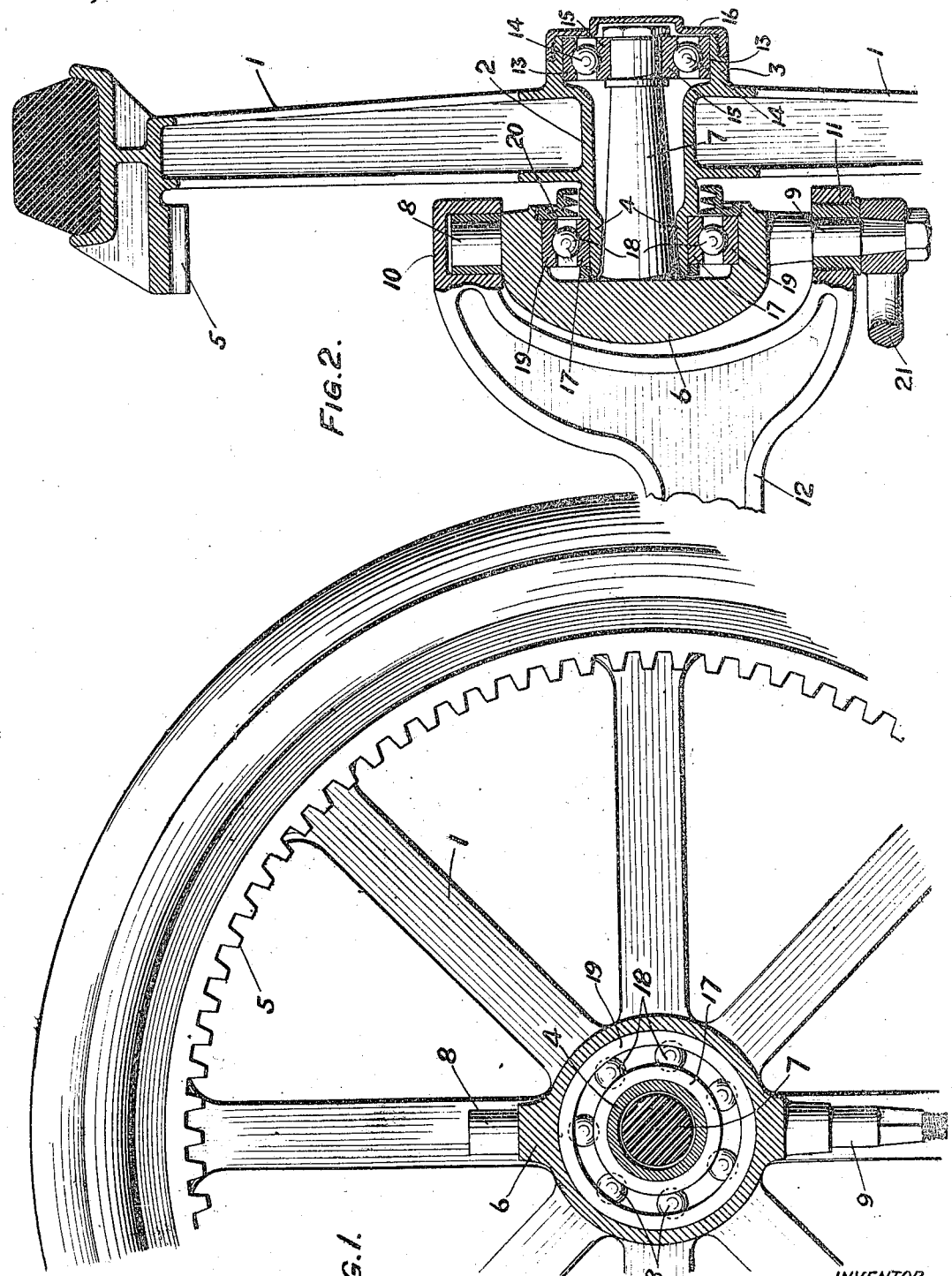

TRACY V. BUCKWALTER, OF ALTOONA, PENNSYLVANIA.

STEERING-KNUCKLE.

962,491.

Specification of Letters Patent.   Patented June 28, 1910.

Application filed January 20, 1909.   Serial No. 473,226.

*To all whom it may concern:*

Be it known that I, TRACY V. BUCKWALTER, a citizen of the United States, residing in the city of Altoona, in the county of Blair and State of Pennsylvania, have invented certain Improvements in Steering-Knuckles, of which the following is a specification.

My invention is an improved steering knuckle designed particularly for motor vehicles, such as automobiles and baggage trucks. Its leading objects are, first, to provide a compact construction wherein the wheel hub shall project little if any beyond the rim; second to reduce the distance between the central plane of the wheel and the axis of the knuckle to the smallest practicable limits, and, third, to provide stable bearings, preferably of the ball type, which take directly the thrust of the driving gear. In the preferred construction, these objects are accomplished by the combination with a traction wheel having a gear thereon, of a knuckle having a horizontal spindle within the hub of the wheel and vertical journals in the central plane of the gear, and annular ball bearings on opposite sides of the central plane of the traction wheel, the outer bearing being disposed between the wheel hub and the spindle, while the inner bearing is disposed between the hub and the knuckle with its central plane in the axis of the journals. But it will be understood that the specific relation of parts stated is not essential to the satisfactory use of my improvements.

The characteristic features of my improvements are disclosed in the accompanying drawings and the following description thereof.

In the drawings, Figure 1 is a sectional elevation of mechanism embodying my improvements, and Fig. 2 is a sectional elevation transverse to the view shown in Fig. 1.

The construction illustrated comprises the traction wheel 1 having the hub 2 with the cylindrical flanges 3 and 4 thereon, a driving gear 5 being fixed to the wheel. The knuckle 6 has the horizontal spindle 7 disposed in the axis of the wheel within the hub 2 which revolves thereon, and the vertical spindles or journals 8 and 9 disposed within the faces of the gear, the journals being revoluble in the respective bearings 10 and 11 of the axle 12. A ring 13 is fixed within the hub flange 3 to provide an outer race for the balls 14 and a ring 15 is fixed on the end of the spindle 7 to provide an inner race for the balls, the ball bearings comprised therein being covered by a cap 16 which screws upon the flange. A ring 17 is fixed on the hub flange 4 to provide an inner race for the balls 18 and a ring 19 is fixed within the knuckle to provide an outer race for these balls, which are in a plane coincident with the vertical axis of the knuckle, this ball bearing being inclosed by a packing ring 20 sleeved on the flange and screwed into the knuckle. The load is thus carried to the wheel through firm bearings disposed between the axle and the hub and the hub and the knuckle respectively so that each bearing carries a substantial part of the load.

It will be observed that while this mechanism is simple and compact in construction and free in movement, it is also stable and subject to as little twisting as practicable; the axis of the knuckle through which the load is transmitted, a ball bearing mechanism through which the knuckle transmits pressure thereon, and the driving gear to which power is applied being in a common plane.

As the knuckle's steering arm 21 is connected close to the center of the traction wheel the latter is steered readily and the shock of obstructions in its path are little felt by the mechanism for shifting the knuckle.

Having described my invention, I claim:

1. The combination of a knuckle having a spindle thereon, a wheel having a hub sleeved on said spindle, anti-friction bearing mechanism disposed between said hub and spindle, and firm anti-friction bearing mechanism disposed between said hub and a part of said knuckle exterior thereto, said bearing mechanism being arranged so that each carries a substantial portion of the load.

2. The combination of a wheel having a hub, a knuckle having a spindle in said hub and an axis transverse to the axis of said spindle, antifriction bearing mechanism between said spindle and hub, and anti-friction bearing mechanism between said knuckle and hub, said knuckle axis passing through said bearing mechanism.

3. The combination of a wheel having a hub, a driving gear fixed to said wheel, a knuckle having a spindle disposed in said hub, antifriction bearing mechanism between said spindle and hub, and anti-friction bearing mechanism between said knuckle and hub, said bearing mechanism between said knuckle and hub and said gear being intersected by a common plane at right angles to their common axis.

4. The combination of a knuckle having a spindle thereon, a wheel having a hub with bearing members at its opposite ends, anti-friction bearings between the outer end of said spindle and one of said hub bearing members, and anti-friction bearings providing firm supporting means between the other of said hub bearing members and a part of said knuckle exterior thereto, the respective anti-friction bearings being arranged so that each carries a substantial portion of the load.

5. The combination of a wheel having a hub, a gear fixed to said wheel, an axle, a knuckle journaled in said axle with the axis of its journal within the faces of said gear and having a spindle within said hub, and anti-friction bearings on opposite sides of said wheel for connecting said hub with said knuckle directly and through said spindle respectively.

6. The combination of a knuckle having a spindle thereon, a wheel having a hub sleeved on said spindle, bearing mechanism disposed between said hub and spindle, and firm bearing mechanism disposed between said hub and a part of said knuckle exterior to said hub, said bearing mechanism being arranged so that each carries a substantial portion of the load.

In witness whereof, I have hereunto set my name this 16th day of January, A. D. 1909, in the presence of the subscribing witnesses.

TRACY V. BUCKWALTER.

Witnesses:
 ROBERT JAMES EARLEY,
 JOS. Q. DENNEY, Jr.